United States Patent [19]
McClure

[11] Patent Number: 4,826,730
[45] Date of Patent: * May 2, 1989

[54] COMPOSITE FILM FOR PROTECTIVE GARMENTS

[75] Inventor: George R. McClure, Claymont, Del.

[73] Assignee: E. I. Du Pont de Nemours and Company, Wilmington, Del.

[*] Notice: The portion of the term of this patent subsequent to Sep. 20, 2005 has been disclaimed.

[21] Appl. No.: 129,022

[22] Filed: Mar. 2, 1988

Related U.S. Application Data

[63] Continuation-in-part of Ser. No. 104,462, Oct. 2, 1987, Pat. No. 4,772,510.

[51] Int. Cl.$^4$ .............................................. B32B 27/00
[52] U.S. Cl. ..................................... 428/421; 428/422
[58] Field of Search ................................ 428/421, 422

[56] References Cited

U.S. PATENT DOCUMENTS

| | | | |
|---|---|---|---|
| 4,230,654 | 10/1980 | Kuga et al. | 264/134 |
| 4,272,851 | 6/1981 | Goldstein | 2/79 |
| 4,416,946 | 11/1983 | Bolt | 428/421 |
| 4,585,694 | 4/1986 | Dehennau | 428/355 |
| 4,659,625 | 4/1987 | Decroly et al. | 428/412 |
| 4,772,510 | 9/1988 | McClure | 428/286 |

OTHER PUBLICATIONS

Du Pont brochure E-32814, "For Hazardous or Dirty Jobs . . . Protect Your Workers with Garments of 'Tyvek'", Spunbonded Olefin (1985-86).

Primary Examiner—James J. Bell

[57] ABSTRACT

A composite film that is particularly useful in protective garments comprises a film layer of polyvinyl or polyvinylidine fluoride or copolymers thereof bonded to a film of polyvinyl alcohol polymer or copolymers thereof.

5 Claims, 1 Drawing Sheet

COMPOSITE FILM FOR PROTECTIVE GARMENTS

CROSS-REFERENCE TO RELATED APPLICATION

This application is a continuation-in-part of Ser. No. 104,462, filed Oct. 2, 1987, now U.S. Pat. No. 4,772,510.

BACKGROUND OF THE INVENTION

1. Field of the Invention

This invention relates to a composite film suitable for use per se or in garments that provide protection against contact with hazardous substances. More particularly, the invention concerns such a film which includes at least two different film layers, one film layer being of polyvinyl or polyvinylidene fluoride and the second film layer being of polyvinyl alcohol.

2. Description of the Prior Art

Workers in many industries and professions need protection from hazardous substances. Some such protection is often in the form of a disposable, or limited use, gloves or outer garments which prevent worker's skin or clothing from contacting the hazardous material. Surgeons, chemical-plant workers, asbestos removers, radioactive-contamination cleaners, disposers of chemical wastes and farmers handling various agricultural chemicals and pesticides are among the many users of such protective gloves and garments. Such gloves and garments need to be as impervious to chemicals as is consistent with safety, comfort and cost. Many of the disposable garments now available commercially provide only short-term protection. Chemicals can pass through the garments in but a few minutes, after which the wearer must immediately leave the work area, remove the contaminated clothing, and bathe. Such short-term protection results in lost production time and, more importantly, in exposure of the worker to the hazardous substances.

Goldstein, U.S. Pat. No. 4,272,851, discloses protective garments made of spunbonded, polyethylene nonwoven sheet (e.g., "Tyvek", sold by E. I. du Pont de Nemours and Company) which may be coated or laminated on one side with a polyethylene film. Du Pont brochure, E-32814, entitled "For Hazardous or Dirty Jobs. . .Protect Your Workers with Garments of "TYVEK" Spunbonded Olefin" discloses garments made from the spunbonded olefin nonwoven sheets laminated with coextruded, multilayered thermoplastic film (e.g., "Saranex", sold by Dow Chemical Company) along with the permeation characteristics of these laminated sheets. "Saranex" is a three-layered laminate of "Saran" vinyl chloride/vinylidene chloride copolymer film, sandwiched between two layers of polyethylene.

Though not related to fabrics for protective garments, Dehennau, U.S. Pat. No. 4,585,694, and Decroly and Dehennau, U.S. Pat. No. 4,659,625, disclose films of polyvinyl fluoride or polyvinylidene fluoride bonded to another polymer. Kuga et al, U.S. Pat. No. 4,230,654, discloses polyvinyl alcohol films coated with copolymer compositions. Bolt, U.S. Pat. No. 4,416,946, discloses a film of polyvinyl alcohol laminated to a substrate, such as a fluorocarbon material, which is then treated with iodine to form a polarizing sheet.

The known protective garments have enjoyed some commercial success. However, if longer times were required before hazardous substances could permeate or pass through the garment (i.e., if the garments possessed longer "hold-out times") the garments would have considerably greater utility. Accordingly, an object of this invention is to provide a composite film that has improved hold-out time characteristics.

SUMMARY OF THE INVENTION

The present invention provides a composite film comprising a first polymeric film layer selected from the group consisting of polyvinyl fluoride (hereinafter also referred to as "PVF"), polyvinylidene fluoride (hereinafter also referred to as "PVF$_2$") and copolymers thereof, bonded to a second film layer selected from the group consisting of polyvinyl alcohol (hereinafter also referred to as "PVA") polymer or copolymers. The bonding between the layers may be provided by adhesives, by thermal bonding, by solvent bonding, by casting one film layer on the other, or the like. Composite film of the invention may be used per se, for example for gloves, garments, packaging materials and the like. Alternatively, the composite may be bonded to other film layers or to knitted, woven or nonwoven fabric layers.

In a preferred embodiment of the composite film of the invention, the first film is of polyvinyl fluoride, the second film is of polyvinyl alcohol, and the films are bonded together by adhesive layers.

In protective gloves, garments or other articles which include composite film of the invention, the polyvinyl fluoride film usually forms the outer surface layer of the article.

Composite films of the invention exhibit hold-out times for various chemicals that are several fold greater than the hold-out times provided by known commercial protective fabrics or by the individual film layers from which the film composite of the invention is made.

BRIEF DESCRIPTION OF THE DRAWINGS

The invention will be better understood by reference to the drawings in which In FIG. 1, 10 is a film layer of polyvinyl fluoride (or polyvinylidene fluoride), 12 and 12' are layers of adhesive, 14 is a film of polyvinyl alcohol, and 16 is an optional textile fabric substrate.

DETAILED DESCRIPTION OF PREFERRED EMBODIMENTS

Figure 1:
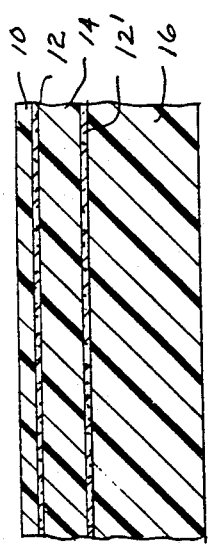
FIG. 1 presents a cross-section view of a composite film of the invention bonded to a fabric substrate and FIG. 2 is a cross-sectional representation of a laboratory apparatus used in Examples I, II and III for determining the hold-out times of test specimens against various liquids.

When the composite film of the invention is incorporated into a protective article (e.g., a glove or a garment) the fluoride-containing film layer 10 usually is positioned on the outside of the article. When the composite film of the invention is incorporated into a protective article that includes a fabric substrate 16, the substrate is usually bonded to the polyvinyl alcohol film layer 14. Conventional methods are suitable for laminating the films to each other and for laminating the PVA film to the textile fabric substrate. Adhesives based on polyesters, polyacrylics, polyurethanes, isocyanates and the like are suitable. Because the PVF and PVF$_2$, films are resistant to adhesion, treatments, such as Lepel or flame treatments, are usually employed to provide active sites for adhesion on the film surface. These, and other such treatments, are well known in the art. Other known techniques, such as solvent bonding and the like can be employed.

Lamination of the polyvinyl alcohol film surface to the optional textile fabric substrate can be accomplished by the same adhesives used to laminate the films. In addition, hot calendering or hot-melt adhesion methods, as well as other known bonding techniques, can be used.

Protective articles (e.g., gloves, shirts, gowns, aprons, coveralls, etc.) can be formed by first cutting the composite film or laminated fabric (which includes the composite film) into the desired shape, followed by seaming, to combine the cut parts. The seams may be formed by ultrasonic bonding, thermal point-bonding, gluing, sewing with thread, or by other equivalent means. If the seams are made by stitching, the needle holes should be covered (e.g., by a protective tape) to block possible seepage paths for liquid from the outer surface to the interior of the article.

Suitable thicknesses for the various components of the composite film of the invention generally are in the range of 0.01 to 0.10 mm for the polyvinyl fluoride (or polyvinylidene fluoride) layer, 0.01 to 0.05 mm for the polyvinyl alcohol layer and at least 0.05 mm for the optional support fabric.

More than one PVF/PVA film laminate can be present in a composite film of the invention. Such a composite would provide further resistance to chemical penetration, but the additional layers reduce wearer comfort and increase cost. Nonetheless, in certain adverse environments, such additional layers may be desirable. For example, a protective article made with PVF/PVA composite film of the invention bonded to both sides of a textile fabric substrate is often preferred for such adverse environments. The PVF film in such cases forms the outermost layers. In another construction in which both sides of a textile fabric substrate are coated, the PVA film may be omitted from the side of the fabric intended for the inside of the protective garment.

The various polymeric layers of the composite film of the invention or of the optional support fabric can contain conventional amounts of known additives, such as pigments, stabilizers, plasticizers, and the like, so long as these additives do not significantly diminish the over-all protective characteristics of the composite film.

In the Examples which follow, two types of apparatus were used to test the resistance of samples to permeation or breakthrough by various chemicals. The time required for such permeation or breakthrough, called "hold-out time", was measured for the specimens of Example I, II and III with the laboratory apparatus of FIG. 2. The laboratory apparatus includes two primary glass parts; elbow 30 and horizontal cylinder 31. A test specimen 50 is placed between the flanged ends 32 and 33 of glass members 30 and 31. The two glass members are held together by bolts 34 which in cooperation with O-rings 35 hold test specimen 50 flat in place. Test liquid 40 is placed in elbow 30 so that it fills the vertical arm of the elbow to a height of about 5 cm above the axis of the horizontal arm. A loose fitting stopper 36 prevents excessive loss of vapors from the elbow. Another stopper 37, containing passage 38 and sampler tube 39, is placed in the other end of horizontal cylinder 31. Air is gently circulated from inside horizontal member 31, through sampler tube 39, to a Combustible Gas Indicator (not shown), Model 40, manufactured by Mine Safety Appliance, Pittsburgh, Pa. The instrument is calibrated against 2% methane in air. The organic liquids that are tested in the apparatus are sufficiently volatile, so that substantially immediately after permeation through the test fabric, enough vapor is generated and transported through sampler tube 39 to be detected by the Combustible Gas Indicator. When the apparatus is used to test hold-out time against acidic or basic liquids, a piece of moistened litmus paper is placed in horizontal cylinder 31 to detect breakthrough. For the specimens of Example IV, "hold-out times" were measured in accordance with American Society of Testing Materials Method ASTM 739-85.

In the examples which follow, the starting materials include at least some of the following:

"Tedlar" TTR05AG2 polyvinyl fluoride (PVF) film, sold by E. I. du Pont de Nemours & Co., Wilmington, Del., of 0.00125-mm (0.0005-inch) thickness and having been flame-treated on one surface for improved adhesion.

"Kynar" polyvinylidene fluoride (PVF$_2$) sold by Penwalt Corp. and extruded into film of 0.076-mm (0.0015-inch) thickness by Westlake Co., Lenni, Pa.

"Mono-Sol" 1.0015-3 polyvinyl alcohol (PVA) film of 0.038-mm thickness, sold by Chris Craft Industrial Products Inc., Gary, Ind.

"Tyvek" Type 1422A spunbonded olefin, a nonwoven sheet sold by E. I. du Pont de Nemours & Co., Wilmington, Del. having a unit weight of 39 g/m$^2$ and a thickness of 0.13 mm.

"Adcote" 333, an isocyanate-terminated prepolymer adhesive, dissolved in methylethyl ketone, sold by Morton Chemical Co., Chicago, Ill.

EXAMPLE I

This example illustrates the fabrication of a PVA/PVF composite film of the invention and demonstrates advantageous and synergistic effects of the composite film in prolonging hold-out of various liquids, as compared to the individual PVA and PVF film layers of which the composite film is composed.

In this example, an Inta Roto coater/laminator, sold by Inta Roto Company of Richmond, Va., was employed to prepare the composite film of the invention. First, a solution of "Adcote" 333 in methylethyl ketone, having a Zahn #2 cup viscosity rate of 25 seconds, was coated on the surface of a length of "Tedlar" PVF film with a gravure roll that had 43.3 lines per cm of roll width. The adhesive-coated PVF film was then passed through a 3.35-meter long oven, which was heated to a temperature in the range of 57° to 63° C. Residence time in the oven was 44 seconds. The coated-and-heated PVF film was then brought into face-to-face contact with a length of "Mono-Sol" PVA film and passed through a nip formed by a polished, chrome-surfaced roll that was heated to 74° C. and an elastomer-covered backup roll having a 70 Shore A durometer hardness. The nip applied a load of 175 N/cm (100 lb/inch) of nip width. The thusly formed composite film was designated Sample I.

Figure 2:
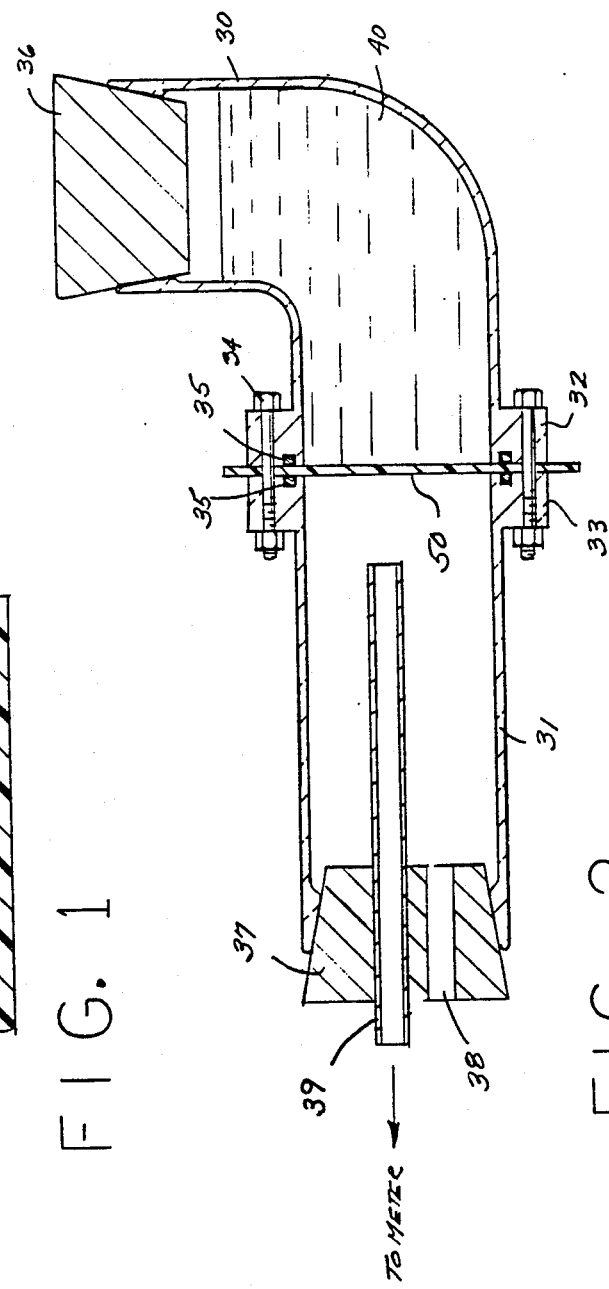

Specimens of Sample I were tested with the laboratory apparatus of FIG. 2 for "hold-out time" of various chemicals. Hold-out times were also measured for specimens of (1) "Mono-Sol" PVA film, which was designated Comparison A and (2) "Tedlar" PVF film, which was designated Comparison B. The results of these measurments are summarized Table I below. Note that if there were no synergism between the individual film layers of the composite of Sample I, then the hold-out time of this composite film of the invention would merely have been the sum of the hold-out times of Comparisons A and B. However, as is clearly shown by the Table below, the composite film of the invention (Sample I) exhibited a strongly synergistic effect. For the listed liquids, hold-out times for Sample I composite film were as much as 7 times longer than the sum of the hold-out times of Comparisons A and B (the individual films which made up the composite).

TABLE I

| Liquid | Hold-out Time, minutes* | | |
|---|---|---|---|
| | Sample | Comparisons | |
| | I | A | B |
| methylethyl ketone | >360 | 15 | 60 |
| methanol | >420 | 10 | 120 |
| methylene chloride | >420 | 15 | 45 |
| tetrahydrofuran | >420 | 60 | 180 |
| carbon disulfide | >420 | 40 | 150 |

*Note:
> a given number of minutes, means that no breakthrough was detected before that number of minutes and that the test was then terminated.

EXAMPLE II

This example also demonstrates the advantageous and synergistic effects in prolonging hold out provided by laminated fabrics which include composite film of the invention, compared to the hold-out times provided by the individual layers of which the laminated fabric is composed.

"Adcote" 333 adhesive solution was coated with a #20-wire-wound rod onto the flame-treated surface of a 30-by-30 cm sample of "Tedlar" PVF film. The coated PVF film was permitted to remain in air at room temperature for 15 minutes so that substantially all the methylethyl ketone solvent evaporated from the adhesive coating. A 30-by-30 cm sample of "Mono-Sol" PVA film was placed on the adhesive-coated surface of the PVF film, smoothed to remove air pockets, and then subjected in a laboratory press to a pressure of 6.89 kPa (1 psi) and a platen temperature of 75° C. for 2 minutes. Another coating of "Adcote" 333 adhesive solution was applied to the PVA surface of the PVA/PVF laminate, dried in air for 15 minutes at room temperature and then laminated to a 30-by-30 cm sample of "Tyvek" spunbonded olefin sheet in the laboratory press under a 6.89-kPa pressure for 2 minutes with a platen temperature at 75° C., to form a laminated fabric that included a composite film of the invention, designated Sample II in the table below.

Specimens of Sample II were tested with the laboratory apparatus of FIG. 2 for the "hold-out time" of various chemicals. Hold-out times were also measured for samples of (1) "Mono-Sol" PVA film, designated Comparison C and (2) a laminate of "Tedlar" PVF film and "Tyvek" spunbonded olefin composite, designated Comparison D. Again note that if there were no synergism among the components of the laminated fabric of Sample II, then the hold-out time of the laminated fabric would merely have been the sum of the hold-out times of Comparisons C and D. However, Table II below, clearly shows that the laminated fabric which included composite film of the invention (Sample II) exhibited a strongly synergistic effect. Hold-out times for Sample II were at least 1.85 times to greater than 14 times longer than the sum of the hold-out times of Comparisons C and D.

TABLE II

| Liquid | Hold-out Time, minutes* | | |
|---|---|---|---|
| | Sample | Comparisons | |
| | II | C | D |
| methylethyl ketone | >360 | 15 | 60 |
| methanol | >420 | 10 | 90 |
| methylene chloride | >420 | 15 | 15 |
| tetrahydrofuran | >360 | 60 | 135 |
| 27% ammonium hydroxide | 45 | 0 | <15 |

*Note: See note to Table I.

EXAMPLE III

The procedure of the second paragraph of Example II was repeated, except that "Kynar" polyvinylidene fluoride (PVF₂) film replaced the "Tedlar" polyvinyl fluoride (PVF) film. Hold-out times were measured with the apparatus of FIG. 2. The hold-out time for the PVF$_2$/PVA/"Tyvek" laminated fabric was 180 minutes for methylethyl ketone and greater than 420 minutes for methylene chloride.

EXAMPLE IV

This example illustrates the fabrication of a laminated fabric, which includes the composite film of Example I bonded to a nonwoven fabric substrate. A comparison of the hold-out time characteristics of this laminated fabric with those of a commercial laminated fabric intended for protective garments demonstrates the superior protection offered by composite film of the present invention.

The composite PVF/PVA film of Example I was bonded to a fabric substrate by the following procedure. "Adcote" 333 solution was applied with the gravure roll of Example I to the PVA surface of the PVF/PVA composite film and then laminated to a length of "Tyvek" spunbonded olefin sheet by means of the same oven and nip as was used for making the composite PVF/PVA film. Oven temperature was in the range of 65° to 70° C., oven residence time was 26 seconds and nip load was 175N/cm.

Samples of the thusly prepared PVF/PVA/"Tyvek" laminated fabric and samples of a prior-art, commercial laminated fabric of "Saranex"/"Tyvek" were tested for resistance to breakthrough by various chemicals in accordance with American Society of Testing Materials Method ASTM 739-85. "Saranex", which is sold by Dow Chemical Company, is a three-layered film laminate of "Saran" sandwiched between two layers of polyethylene. "Saranex"/"Tyvek" laminates are sold by Shawmut, Inc. of Boston, Mass., among others. The time for a given chemical to break-through or penetrate a fabric sample (i.e., hold-out time) was measured. Samples were tested for a maximum of 480 minutes.

TABLE III

| Chemical | Hold-out Time, minutes* | |
|---|---|---|
| | Invention | Prior Art |
| carbon disulfide | >480 | 0 |
| diethyl ether | >480 | 120 |
| ethyl acetate | >480 | 45 |
| methylene chloride | 45 | 0 |
| tetrahydrofuran | 13 | 0 |

* Note:
>480 minutes means no breakthrough was detected before the test was terminated and 0 minutes means breakthrough was detected almost immediately.

I claim:

1. A composite film, particularly suited for use in gloves or in a protective garment, a first layer of polymeric film selected from the group consisting of polyvinyl fluoride, polyvinylidene fluoride and copolymers thereof, bonded to a second layer of polymeric film selected from the group consisting of polymers and copolymers of polyvinyl alcohol.

2. A composite film of claim 1 wherein an adhesive bonding layer is positioned between the first and second film layers.

3. A composite film of claim 1 or 2 wherein the first film layer is of polyvinylfluoride and the second film layer is of polyvinyl alcohol.

4. A composite film of claim 1 or 2 wherein the first film layer is of polyvinylidine fluoride and the second film layer is of polyvinyl alcohol.

5. A glove made from a composite film of claim 1 or 2 wherein the first film layer forms the outside surface of the glove.

* * * * *